(12) United States Patent
Kanbach

(10) Patent No.: US 6,364,568 B2
(45) Date of Patent: *Apr. 2, 2002

(54) CURTAIN ROD WITH A MIDDLE SUPPORT

(76) Inventor: Wolfgang H. Kanbach, Am Winterfeld 3-7, 56721 Mündersbach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,902
(22) PCT Filed: Aug. 4, 1998
(86) PCT No.: PCT/DE98/02223
§ 371 Date: Jun. 1, 1999
§ 102(e) Date: Jun. 1, 1999
(87) PCT Pub. No.: WO99/09872
PCT Pub. Date: Mar. 4, 1999

(30) Foreign Application Priority Data

Aug. 22, 1997 (DE) .......................................... 197 36 565

(51) Int. Cl.⁷ ................................................ A47H 1/142
(52) U.S. Cl. ...................... 403/299; 403/361; 248/252; 248/200.1
(58) Field of Search ................................ 403/361, 299, 403/43, 44, 47, 48; 248/252, 261, 200.1; 211/105.1, 105.3, 105.4, 123; 160/330, DIG. 6

(56) References Cited

U.S. PATENT DOCUMENTS

| 2,474,434 | A | | 6/1949 | Mentz | |
|---|---|---|---|---|---|
| 3,030,061 | A | * | 4/1962 | Jennings | 403/43 |
| 3,498,652 | A | * | 3/1970 | Cass | 403/43 X |
| 3,822,850 | A | * | 7/1974 | Elias | 248/252 X |
| 3,880,394 | A | * | 4/1975 | Wisecarver | 211/123 X |
| 3,948,475 | A | * | 4/1976 | Jones | 211/105.4 X |
| 5,875,601 | A | * | 3/1999 | Gutelius, Jr. et al. | 403/43 X |

FOREIGN PATENT DOCUMENTS

| DE | 7922045 | | 8/1979 |
|---|---|---|---|
| DE | 296 10 663 | U1 | 10/1996 |
| FR | 2193563 | | 2/1974 |

* cited by examiner

Primary Examiner—Lynne H. Browne
Assistant Examiner—John R. Cottingham
(74) Attorney, Agent, or Firm—Friedrich Kueffner

(57) ABSTRACT

A device for connecting two support members, arranged spaced apart from each other by a distance and designed for supporting drapes, net curtains, and similar decorative items, has a support rod having first and second ends. Each of the ends is supported by one of the support members. The support rod has at least at the first end a threaded part, wherein the support member at the first end of the support rod has a threaded mating piece for engagement with and for tensioning the support rod between the two support members.

11 Claims, 1 Drawing Sheet

CURTAIN ROD WITH A MIDDLE SUPPORT

BACKGROUND OF THE INVENTION

1. Field of the Invention

The invention pertains to a device for connecting two support parts a certain distance apart, especially for the support of drapes, net curtains, and similar decorative items, consisting of a rod-like intermediate piece, each end of which is held by a support part.

2. Description of the Related Art

Connecting devices which consist of two support parts which can be attached to a wall or to the ceiling a certain distance away from each other to hold drapes, net curtains, or other decorative items are known. These two support parts are then connected to each other by a rod-like intermediate piece, each end of which is held by one of the support parts. The rod-like intermediate piece can be either a solid piece or a tube. Depending on the size of the cross section of the rod-like intermediate piece and on the weight of the drapes, net curtains, or other decorative items, the distance between the support parts may not exceed a certain value, because otherwise the intermediate piece will visibly sag, which has a negative effect on the visual impression. For example, for an intermediate piece with a diameter of 10 mm, the distance between the two support parts may not be much greater than about 70 cm. When longer intermediate pieces are used, therefore, it is necessary to use intermediate support parts between the support parts at the ends; this intermediate support severely limits the range over which the drapes, net curtains, and similar decorative items can be slid back and forth. This means that it is necessary to select rod-like intermediate pieces with much larger cross sections, which again, depending on the drapes, net curtains, or similar decorations, has a disadvantageous effect on the visual impression of the connecting device.

SUMMARY OF THE INVENTION

The invention is therefore based on the task of designing a device for connecting two support parts a certain distance away from each other, especially for the support of drapes, net curtains, or similar decorative items, in such a way that the distance between the two support parts holding the rod-like intermediate piece can be significantly increased while allowing the use of an intermediate piece with the smallest possible cross section and thus so that the drapes, net curtains, or other decorative items can be slid back and forth over a relatively long distance without the need to divide them. There will thus be almost no further need for intermediate support parts.

To accomplish this task with a device of the general type described above, it is proposed according to the invention that the rod-like intermediate piece be connected at least at one end to a threaded part, and in that the support part facing this end of the intermediate piece have a threaded mating piece which works together with the threaded part of the intermediate piece to tension it.

As a result of a design such as this, the intermediate piece can be tensioned or pretensioned between the support parts which hold it. As a result of this tension or pretension, the distance previously possible between the two support parts can be increased considerably while allowing the use of an intermediate piece with the smallest possible cross section. Thus the distance over which the drapes, net curtains, and or other decorative items can be pushed back and forth is considerably expanded. Interfering intermediate support parts, which are associated with additional installation work and expense, can thus be eliminated almost entirely.

The device according to the invention can also be used, for example, on stair landings or the like, where the rod-like intermediate pieces are used and tensioned between two supporting railing posts. This device can also be used on balconies, as a room divider, and as a hand or bath towel rack.

BRIEF DESCRIPTION OF THE DRAWINGS

The invention is explained in greater detail below on the basis of an exemplary embodiment, illustrated in a drawing.

DESCRIPTION OF THE PREFERRED EMBODIMENT

Figure 1:
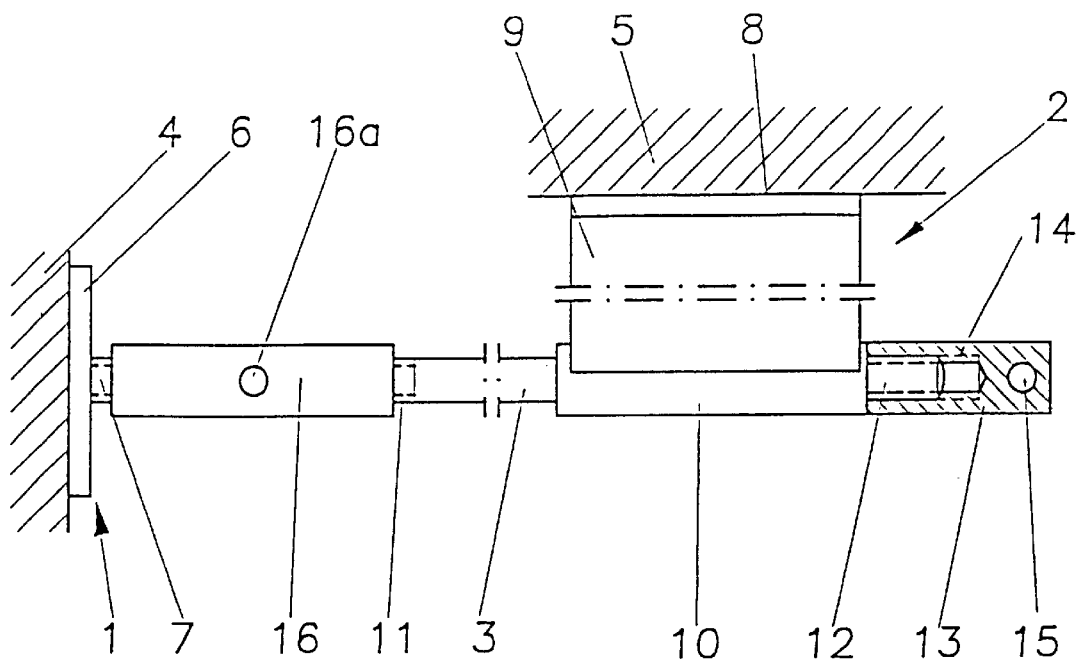
FIG. 1 shows a design of a device according to the invention.

FIG. 1 of the drawing shows a device for holding drapes, net curtains, and similar decorative items, which consists initially of two support parts 1, 2, which are designed differently from each other and which serve to hold a rod-like intermediate piece 3, only part of which is shown, from which drapes, net curtains, and similar decorative items are hung by means of special fastening devices in such a way that they can be slid back and forth. Support part 1 serves here to connect the end of rod-like intermediate piece 3 to a wall 4, whereas support part 2 is designed so that it can be used to attach rod-like intermediate piece 3 a certain distance away from, and parallel or nearly parallel to, a wall 5. Depending on how the drapes, net curtains, or similar decorative items are to be hung, either the combination of support parts 1, 2 shown in the drawing, a set of two support parts 1, or a set of two support parts 2 will be used. Support parts 2 can be nearly any length desired, and this dimension should be selected with the understanding that it determines the distance between rod-like intermediate piece 3 and wall 5.

Support part 1 consists of a disk 6, such as a disk of high-grade steel or brass, which is provided with several holes, not shown in the drawing, by means of which disk 6 can be attached to wall 4 with screws and plugs. The base of disk 6 can be designed to have nearly any shape desired; that is, disk 6 can be round, oval, triangular, rectangular, or polygonal. In the center of disk 6, a threaded pin 7 is provided on the side facing away from the wall; this pin is rigidly connected to disk 6 by welding or brazing, for example. Threaded pin 7 can also be screwed and/or riveted to disk 6.

Support part 2 also consists of a disk 8, such as a disk of brass or high-grade steel, which is provided in the same way as disk 6 with holes (not shown), by means of which disk 8 can be attached to wall 5 with screws and plugs. Disk 8 accepts a bracket 9, which can be in the form of a plate, for example, which can also consist of brass or high-grade steel or some other material. This bracket 9 is rigidly connected to disk 8 by welding or brazing or by the use of screws. The length of bracket 9 depends on the distance which is to be present between rod-like intermediate piece 3 and wall 5. The end of bracket 9 facing away from disk 8 is connected to a sleeve 10, which advantageously consists of the same material as bracket 9 and/or disk 8. Sleeve 10 can be connected to bracket 9 by brazing or welding If, for example, disk 8 is screwed to bracket 9, it is advantageous to use screws which are long enough to attach sleeve 10 to bracket 9 as well.

In the present exemplary embodiment, rod-like intermediate piece 3 has a circular, solid cross section. It is also possible, however, for rod-like intermediate piece 3 to be a tube. It is possible in principle for rod-like intermediate piece 3 to have some other cross-sectional form such as rectangular, hexagonal, or oval. An intermediate piece with this type of cross section, however, should nevertheless change over into a circular cross section at its ends, to the extent possible.

In the case of the exemplary embodiment according to FIG. 1, sleeve 10 has a hole (not-shown) all the way through it. The diameter of this hole is the same as the outside diameter of rod-like intermediate piece 3, and it is selected so that rod-like intermediate piece 3 can be pushed through sleeve 10 with little if any play. In the illustrated exemplary embodiment, rod-like intermediate piece 3 is provided at each end with a threaded part 11, 12, which is advantageously designed to form a single unit with rod-like intermediate piece 3.

Intermediate piece 3 is now pushed through sleeve 10 until at least threaded part 12 projects a certain short distance out from sleeve 10. A threaded mating piece 13, which has an internal thread 14, is now placed on this threaded part 12 and loosely turned a few turns. In the illustrated exemplary embodiment, threaded mating piece 13 has a cylindrical outside contour, which matches the external cross section of sleeve 10. This threaded mating piece 13 is provided with a hole 15, into which a tommy bar, known in and of itself, can be inserted. This tommy bar makes it easier to rotate threaded mating piece 13.

Threaded part 11 can also be inserted into a support part 2 in the same way that threaded part 12 has been. In the exemplary embodiment according to FIG. 1, however, threaded part 11 is screwed instead into the internal thread of a tubular threaded mating piece 16. Threaded mating piece 16 is designed as, for example, a so-called turnbuckle, which has the opposite-handed thread, e.g., a left-handed thread, on the end facing away from threaded part 11. This pieces is now turned a few turns onto threaded pin 7 of support part 1. Threaded mating piece 16 is provided with a hole 16a, into which a tommy bar can be inserted to make it easier to turn the mating piece. As soon as rod-like intermediate piece 3 has been connected in the manner described to support parts 1, 2, and the drapes, net curtains, or similar decorative items have been attached, threaded mating pieces 13, 16 are now turned so that intermediate piece 3 is tensioned or pretensioned between the two support part 1, 2. This pretension ensures that intermediate piece 3, even if very long, does not sag downward to a visually obvious extent in the middle area either under its own weight or under the effect of the sliding back and forth of the drapes, net curtains, or other decorative items.

As a result of this pretension, it is possible, therefore, to use rod-like intermediate pieces 3 with relatively small cross sections and nevertheless to allow support parts 1, 2 to be relatively far apart. Thus the intermediate support parts which used to be required are no longer needed, and a large, free area is provided over which the drapes, net curtains, or other similar decorative items can be slid back and forth.

In the case of the exemplary embodiment according to FIG. 1, rod-like intermediate piece 3 is tensioned at its both ends. It is also possible, however, to screw rod-like intermediate piece 3 by means of threaded part 11, for example, into a nut connected to disk 8 and to tension it only by way of threaded mating piece 13. If required, it is also possible to use the opposite approach. For example, in the case of a hollow, rod-like intermediate piece 3, the threaded part (internal thread) can be machined into its interior, and the threaded mating piece can be designed as a threaded pin or screw.

Figure 2:
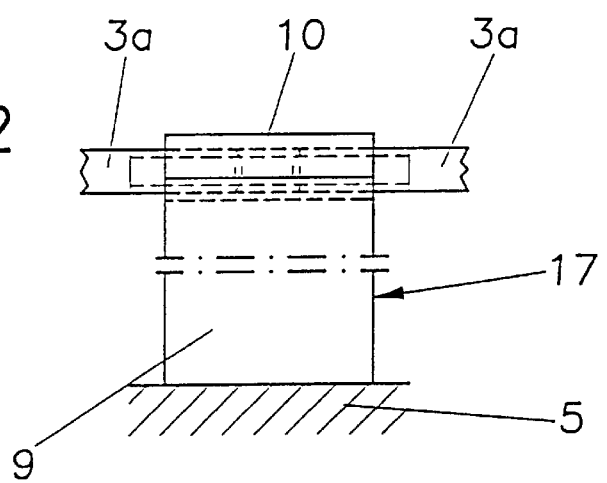
FIG. 2 shows a design of an intermediate support part for use in conjunction with the device according to FIG. 1.

In cases where an intermediate piece 3 is too long, it may prove necessary to divide it and to connect the two parts to each other by a support part 17 according to FIG. 2. This support part 17 is attached directly to wall 5, that is, not by way of a disk 8, by rather by a bracket 9. On the side facing away from wall 5, bracket 9 carries a sleeve 10.

In contrast to sleeve 10 according to FIG. 1, sleeve 10 according to FIG. 2 has a thread machined into it, so that parts 3a of the rod-like intermediate piece 3 can be screwed into it from both ends.

As a modification of the exemplary embodiment explained above, it is also possible to use rod-like intermediate piece 3 to fill out railings or the like. In this case, rod-like intermediate piece 3 is tensioned between two supporting railing posts. It is also possible to design support parts 1, 2, and 17 so that connections can be made in such a way that tensionable intermediate piece 3 is not perpendicular to a wall 4 or parallel to a wall 5 or so that the two parts 3a of the intermediate piece are not in alignment with each other.

What is claimed is:

1. A device for connecting two support members arranged spaced apart from each other by a distance, and drapes, net curtains, and similar decorative items supported by the device, the device comprising a straight elongated support rod having first and second ends, each end being supported by one of the support members, the support rod extending at least at the first end thereof through the support member and comprising a threaded part projecting out of the support member, further comprising a threaded mating piece in engagement with the threaded part and for tensioning the support rod between the two support members.

2. The device according to claim 1, wherein the support rod is comprised of a tube.

3. The device according to claim 1, wherein the threaded part connected to the first end is comprised of a threaded pin.

4. The device according to claim 3, wherein the support rod and the threaded part are integrally connected to each other.

5. The device according to claim 1, wherein the threaded mating piece is comprised of a threaded nut.

6. The device according to claim 5, wherein the threaded mating piece comprises a turning element.

7. The device according to claim 6, wherein the turning element is configured to receive a tommy bar.

8. The device according to claim 1, wherein the support member at the first end of the support rod is a cantilevering bracket adapted to be attached to a wall or ceiling, wherein the support member at the first end additionally has a sleeve for receiving the support rod.

9. The device according to claim 8, wherein the sleeve has an interior provided at least at one side thereof with an internal thread.

10. The device according to claim 1, wherein the support member at the second end of the support rod is comprised of a disc having a threaded pin.

11. The device according to claim 1, wherein the support member at the first end is comprised of a sleeve with an internal thread.

* * * * *